United States Patent
Khan et al.

(10) Patent No.: US 7,090,274 B1
(45) Date of Patent: Aug. 15, 2006

(54) VEHICLE STORAGE STRUCTURE

(75) Inventors: Moonis F. Khan, Grand Blanc, MI (US); Randy Johnson, White Lake, MI (US); Sharad Kulkarni, Farmington Hills, MI (US); Betina Hougesen, Windsor (CA)

(73) Assignee: Nissan Technical Center North America, Inc., MI (US)

( * ) Notice: Subject to any disclaimer, the term of this patent is extended or adjusted under 35 U.S.C. 154(b) by 56 days.

(21) Appl. No.: 11/055,112

(22) Filed: Feb. 11, 2005

(51) Int. Cl.
*B60N 3/12* (2006.01)

(52) U.S. Cl. ................... 296/37.16; 296/37.14

(58) Field of Classification Search ............ 296/37.16, 296/37.1, 37.3, 100.09
See application file for complete search history.

(56) References Cited

U.S. PATENT DOCUMENTS

| | | | |
|---|---|---|---|
| 4,869,541 A * | 9/1989 | Wainwright ............. | 296/65.09 |
| 5,195,795 A * | 3/1993 | Cannera et al. .......... | 296/65.09 |
| 5,868,451 A * | 2/1999 | Uno et al. ............... | 296/65.05 |
| 5,871,255 A * | 2/1999 | Harland et al. .......... | 296/65.05 |
| 5,890,758 A * | 4/1999 | Pone et al. .................... | 296/66 |
| 6,015,071 A | 1/2000 | Adomeit et al. | |
| 6,290,277 B1 * | 9/2001 | Spykerman et al. ..... | 296/37.16 |
| 6,644,709 B1 * | 11/2003 | Inagaki et al. ........... | 296/37.16 |
| 6,698,829 B1 * | 3/2004 | Freijy et al. ............. | 296/65.01 |
| 6,752,304 B1 | 6/2004 | Hotary et al. | |
| 6,811,200 B1 * | 11/2004 | Shibata et al. ............ | 296/37.15 |
| 6,945,594 B1 * | 9/2005 | Bejin et al. ............... | 296/37.16 |
| 7,011,352 B1 * | 3/2006 | Matsuoka et al. ........ | 296/37.14 |
| RE39,101 E * | 5/2006 | Miyahara et al. ......... | 296/65.11 |
| 7,051,825 * | 5/2006 | Masui et al. ................ | 180/68.5 |
| 2002/0179663 A1 * | 12/2002 | Moore et al. ................ | 224/539 |
| 2003/0122397 A1 | 7/2003 | Maiborn | |
| 2003/0156421 A1 | 8/2003 | Gehring et al. | |
| 2003/0165875 A1 | 9/2003 | Anderson et al. | |
| 2004/0061370 A1 | 4/2004 | Drew et al. | |
| 2004/0066053 A1 | 4/2004 | Fero | |
| 2004/0105744 A1 * | 6/2004 | Warner et al. .............. | 414/522 |
| 2004/0124654 A1 | 7/2004 | Song | |
| 2005/0264067 A1 * | 12/2005 | Rhodes et al. .............. | 297/257 |

\* cited by examiner

*Primary Examiner*—Kiran B. Patel
(74) *Attorney, Agent, or Firm*—Global IP Counselors

(57) ABSTRACT

A vehicle body structure includes a storage box installed in a location within the vehicle that is originally arranged and configured to receive a rear passenger's seat. The storage box has an upper opening and a cargo cavity that extends downwardly from the upper opening below an upper surface of the vehicle floor. A storage cover overlies the upper opening of the storage box. The storage cover has first and second lids. The first lid is arranged to move between a closed position covering a forward area of the cargo cavity and an open position exposing the forward area of the cargo cavity to the side access opening. The second lid is arranged to move between a closed position covering a rearward area of the cargo cavity and an open position exposing the rearward area of the cargo cavity to the rear access opening.

10 Claims, 14 Drawing Sheets

VEHICLE STORAGE STRUCTURE

BACKGROUND OF THE INVENTION

1. Field of the Invention

The present invention generally relates to a vehicle body structure that includes a storage box. More specifically, the present invention relates to a storage box that is installed in an area within the vehicle body structure that is arranged and configured to receive a passenger seat.

2. Background Information

Most vehicles have one or two rows of seats with a storage compartment or storage area in the rear portion of the vehicle behind the last row of passenger seats. In some vehicles, such as station wagons, sport utility vehicles and vans, the storage area behind the last row of seats is a large open area. Depending on the construction of the vehicle, some vehicles have in floor storage to provide hidden cargo storage spaces that can accommodate a variety of cargo loads.

For example, U.S. Pat. No. 6,752,304 to Hotary et al. discloses a rear cargo storage assembly that includes a small storage compartment within the rear floor portion of a vehicle covered by two removable lid portions. The two lid portions lay flat in a horizontal orientation to cover the small storage compartment but can be lifted up and arranged in a vertical orientation so that grocery bags and/or other cargo can be supported therebetween.

However, in recent years, many vehicles have been produced that are larger and have an optional third row of passenger seats. Thus, the storage compartments such as the ones disclosed in the above mentioned patent do not taken advantage of those areas of the vehicle typically used for installing passenger seats, when the additional row of passenger seats are not installed. One reason for this omission is that the portion of the floor of a vehicle body structure that is formed for receiving a seat those areas of the vehicle typically used for installing passenger seats has seat mounts such that storage is not possible when the row of seats are installed. Moreover, this floor portion of the vehicle body structure is not always flat and continuous. In other words, if the last row of passenger seats has been removed, the uneven surfaces of the floor are unsuitable for cargo without modification.

In view of the above, it will be apparent to those skilled in the art from this disclosure that there exists a need for an improved vehicle body structure that utilizes uneven surfaces within the vehicle such that those surfaces become usable level cargo spaces. This invention addresses this need in the art as well as other needs, which will become apparent to those skilled in the art from this disclosure.

SUMMARY OF THE INVENTION

It has been discovered that if the last row of passenger seats has been removed, there is useful space that can be converted into a storage compartment or box. In view order to take advantage of this unused space in the vehicle, the present invention was conceived. One object of the present invention is to provide a storage compartment or box that utilizes the area where an optional row of passenger seats can be installed.

In accordance with one aspect of the invention, a vehicle body structure is provided that basically comprises a vehicle side body, a vehicle floor, a storage box and a storage cover. The vehicle side body includes a side access opening and a rear access opening. The vehicle floor is fixedly coupled to the vehicle side body with the vehicle floor including a cargo surface. The storage box includes a plurality of walls defining an upper opening and a cargo cavity extending downwardly from the upper opening below the cargo surface of the vehicle floor. The storage cover overlies the upper opening of the storage box. The storage cover includes first and second lids with the first lid being located forwardly of the second lid in a forward to aft direction of the vehicle floor. The first lid is arranged to move between a closed position covering a forward area of the cargo cavity and an open position exposing the forward area of the cargo cavity to the side access opening. The second lid is arranged to move between a closed position covering a rearward area of the cargo cavity and an open position exposing the rearward area of the cargo cavity to the rear access opening.

In another aspect of the invention, a vehicle body structure is provided that basically comprises a vehicle floor, a storage box and a storage cover. The vehicle floor has a cargo surface with a primary interior flooring material overlying the cargo surface of the vehicle floor. The storage box is installed on a portion of the vehicle floor, and includes a plurality of walls defining an upper opening and a cargo cavity extending downwardly from the upper opening below the cargo surface of the vehicle floor. The storage cover overlies the upper opening of the storage box. The storage cover includes a first lid with a first vehicle interior facing surface, a second lid with a second vehicle interior facing surface, and a secondary interior flooring material overlying the first and second vehicle interior surfaces of the first and second lids with the secondary interior flooring material forming a living hinge coupling the first and second lids together.

In yet another aspect of the invention, a vehicle body structure is provided that basically comprises a vehicle side body, a vehicle floor, a row of first seats, a row of second seats, a third seat receiving recess, a cargo space, a storage box and a storage cover. The vehicle side body has a side access opening and a rear access opening. The vehicle floor is fixedly coupled to the vehicle side body with the vehicle floor including an cargo surface. The row of first seats is fixedly coupled to the vehicle floor at a first longitudinal location within the vehicle side body. The row of second seats is fixedly coupled to the vehicle floor at a second longitudinal location within the vehicle side body. The third seat receiving recess is formed in the vehicle floor that is configured to receive a row of third seats. The cargo space is located between the third seat receiving recess and the rear access opening. The storage box is installed in the third seat receiving recess. The storage box includes a plurality of walls defining an upper opening and a cargo cavity extending downwardly from the upper opening below the cargo surface of the vehicle floor. The storage box is configured to encompass substantially an entire area of the vehicle floor from the second seats to the cargo space and laterally between the vehicle side body. The storage cover overlies the upper opening of the storage box.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
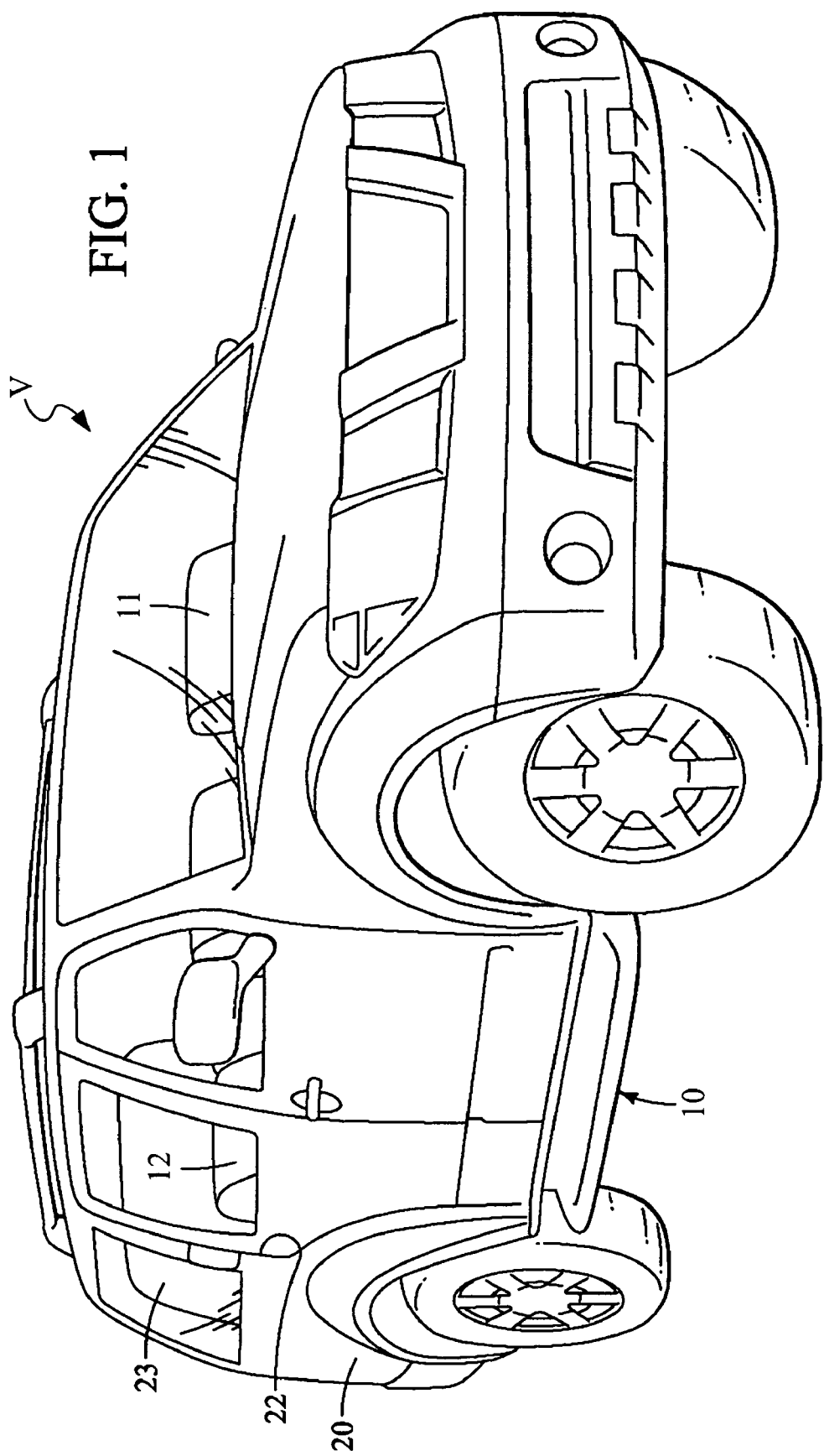
FIG. 1 is a perspective view of a vehicle that includes a vehicle body structure equipped with a storage box in accordance with one embodiment of the present invention.
Figure 2:
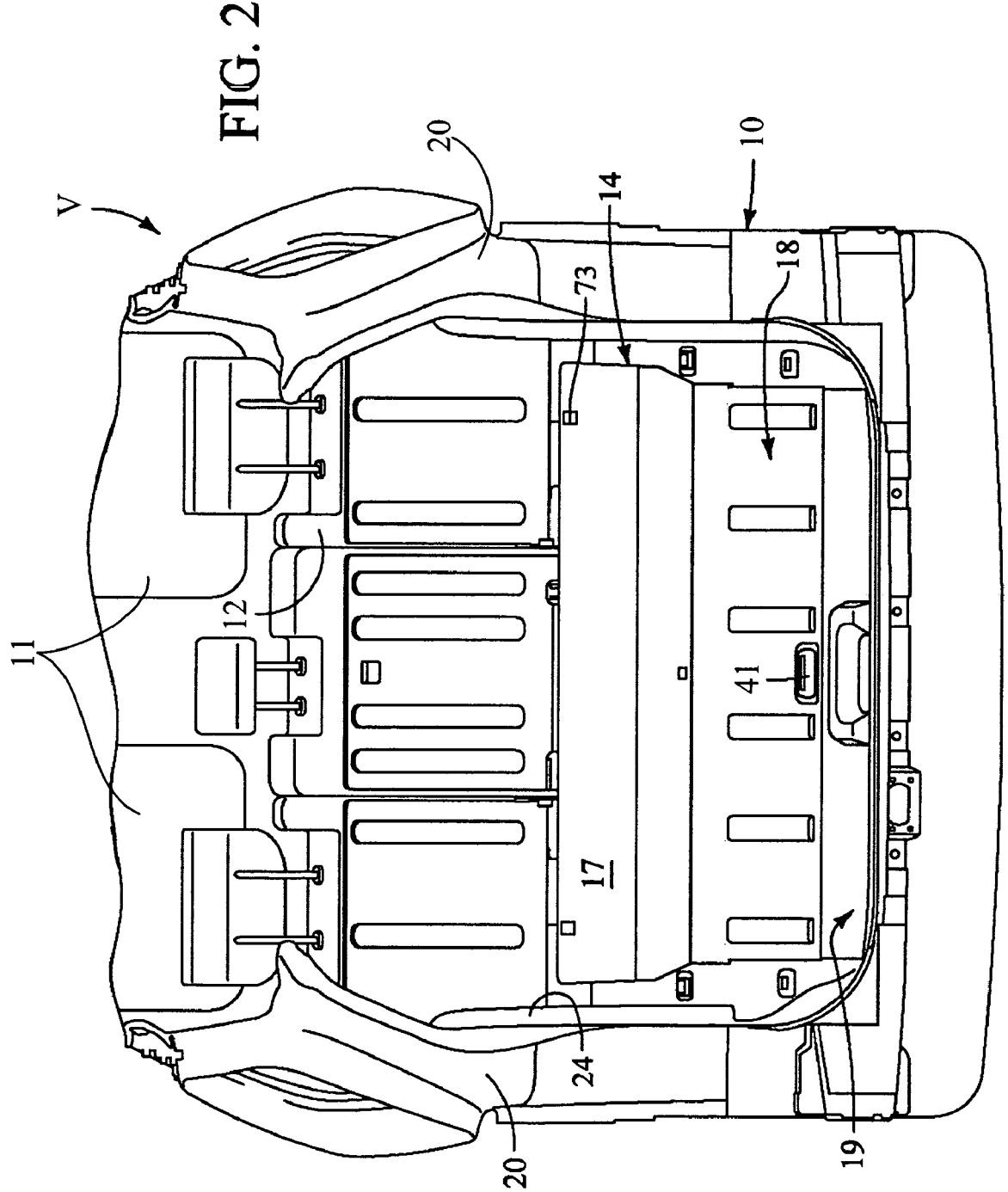
FIG. 2 is a rear perspective view of the vehicle body structure depicted in FIG. 1, from an elevated angle showing the rear portion of the vehicle with a rear hatch removed to reveal details of the interior of the vehicle body structure, including a storage box cover that conceals the storage box, in accordance with the present invention.

Referring initially to FIGS. 1 and 2, a vehicle V is illustrated that has a vehicle body structure 10 that can accommodate three rows of passenger seats within the interior of the vehicle V in accordance with a first embodiment of the present invention. The vehicle body structure 10 is equipped with a first row of passenger seats 11 and a second row of passenger seats 12 with the third row seat area having a storage box 14 when the third row of passenger seats is removed in accordance with a first embodiment of the present invention. While the present invention is used with the vehicle body structure 10 that can accommodate three rows of passenger seats, it will be apparent to those skilled in the art from this disclosure that the present invention can be used in a vehicle body structure has two rows of passenger seats with the storage box 14 installed in the area of the second row of passenger seats when the second row of passenger seats are removed.

In the illustrated embodiment, the storage box 14 is located behind the second row of seats 12 within the interior of the vehicle in the area where the third row of passenger seats would other wise be installed. The storage box 14 provides additional compartment storage space within the vehicle V. A storage box cover 17 conceals the storage box 14 and its contents, as shown in FIG. 2. The storage box cover 17 is flat and rests at approximately the same level as a cargo surface 18 at the rear of the vehicle V. Thus, the storage box cover 17 provides an extended flat cargo space within the vehicle V in concert with the cargo surface 18, as is described in greater detail below. The storage box 14 and the storage box cover 17 of the present invention, are described in greater detail below following a brief description of portions of the vehicle body structure 10. Description of those portions of the vehicle body structure 10, such as suspension and power train elements and structural components well known in the art are omitted for brevity.

Figure 3:
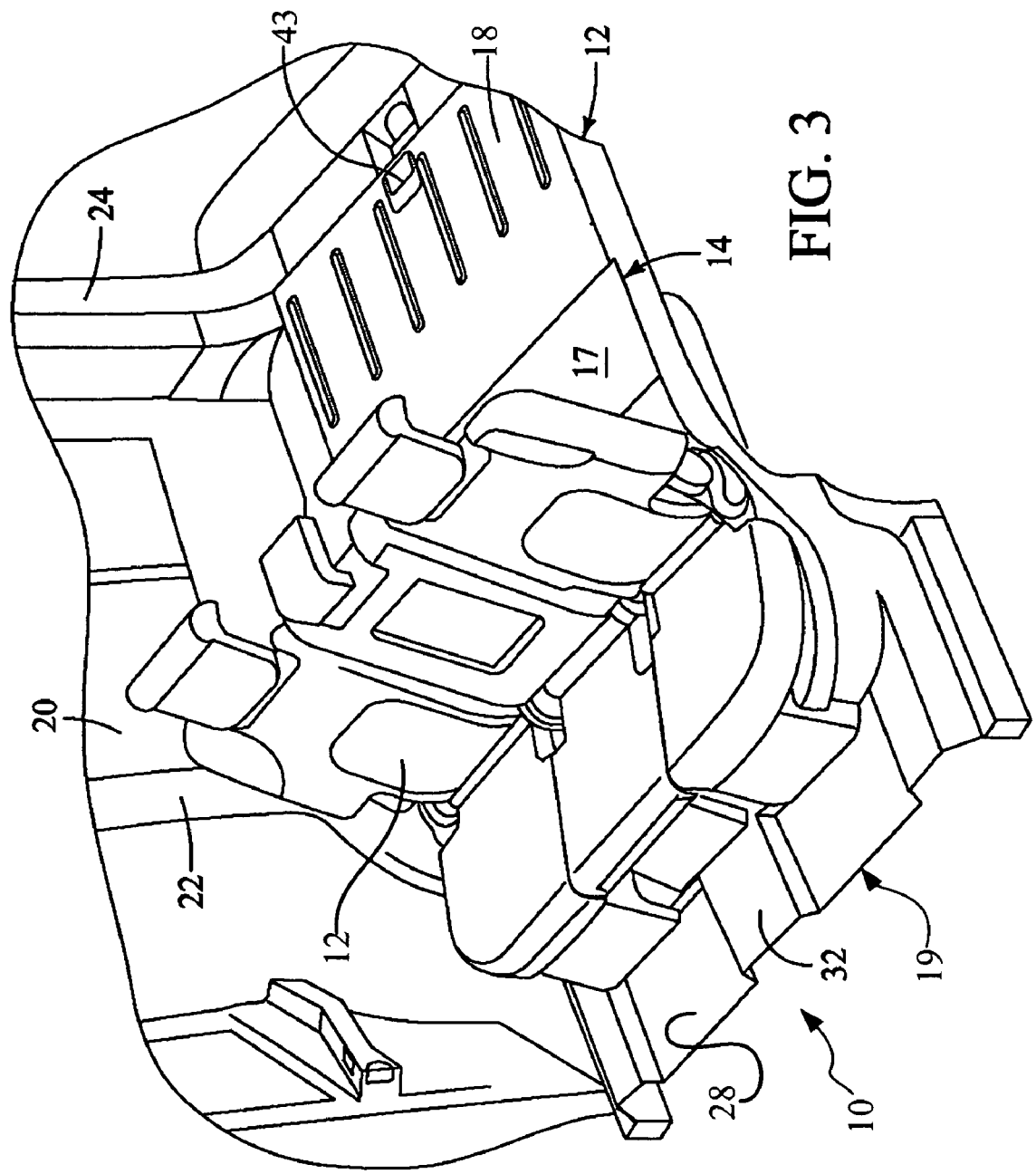
FIG. 3 is a partial perspective view of the vehicle depicted in FIGS. 1 and 2 with portions of the vehicle removed to show details of the interior of the vehicle including the second row of seats, the rearward cargo deck and the storage box, in accordance with the present invention.

As shown in FIGS. 1, 2 and 3, the primary parts of the vehicle body structure 10 includes the storage box 14 and the storage box cover 17 that are installed on a vehicle floor 19 of the vehicle V. However, in accordance with other aspects of the invention, the vehicle body structure 10 further includes a pair of vehicle side body portions 20, a pair of side door openings 22, a rear hatch 23, and a rear hatch opening 24.

As shown in FIGS. 2 and 3, the vehicle floor 19 of the vehicle body structure 10 is fixedly coupled to the vehicle side body portions 20 in a manner well known in the art, for instance, welding techniques. The vehicle floor 19 is preferably formed of a sheet metal material that is molded, pressed or stamped into appropriate dimensions, but can alternatively be formed of a composite material, metal alloys, or any other material that provides the structural integrity necessary to support the elements installed within the vehicle V. The vehicle floor 19 is typically covered with an interior flooring material, such as automotive carpeting.

Figure 4:
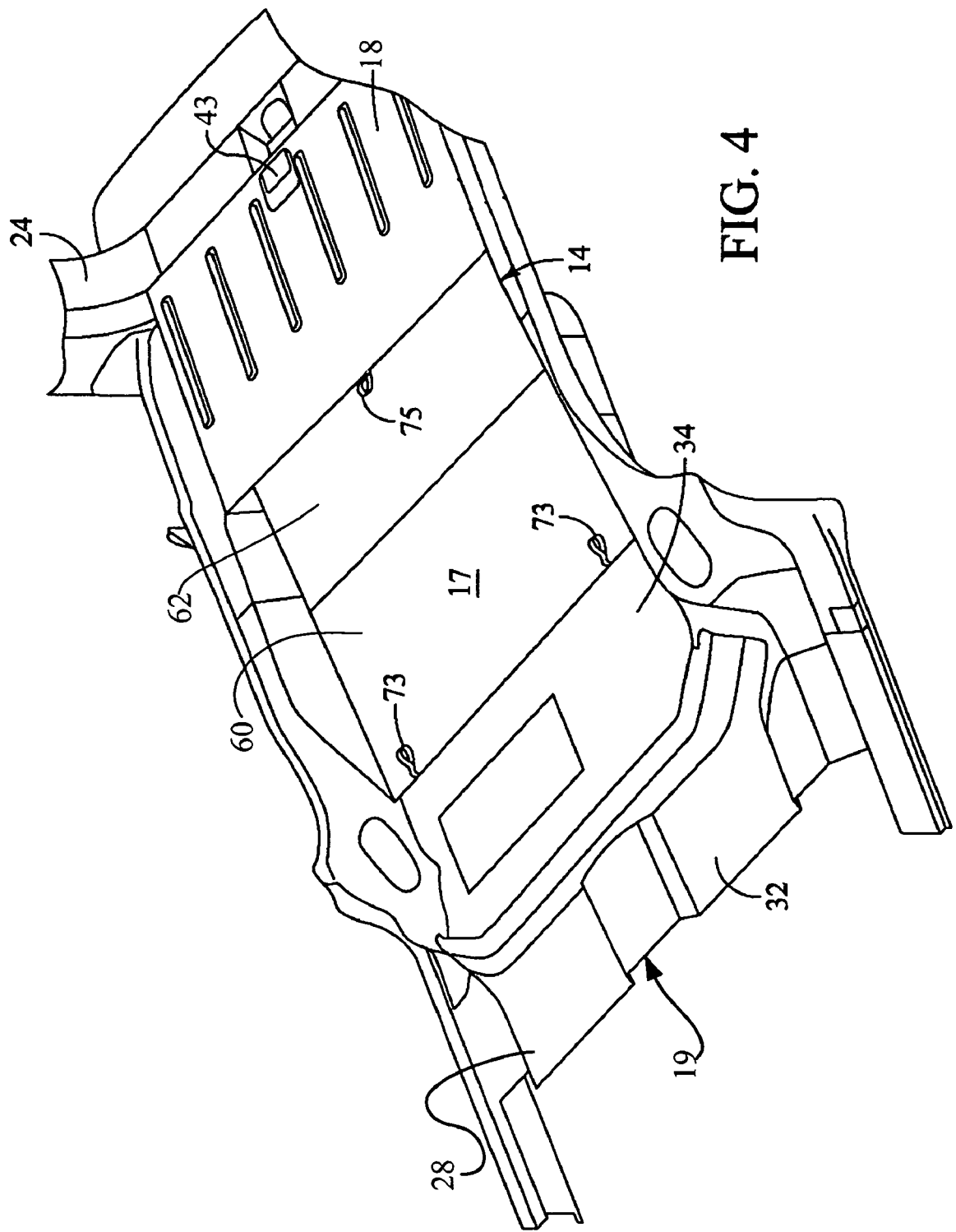
FIG. 4 is another perspective view, similar to FIG. 3, with the second row of seats removed to reveal details of the storage box cover and the rearward cargo space, in accordance with the present invention.

As shown in FIGS. 3 and 4, the storage box 14 and the storage box cover 17 lie on the vehicle floor 19 behind the second row of seats 12 and forward of the cargo surface 18.

The storage box cover 17 is at approximately the same level as the cargo surface 18 thereby increasing the available flat cargo space available within the vehicle V. Note that the second row of seats 12 has been removed in FIG. 4 to provide greater clarity.

Figure 5:
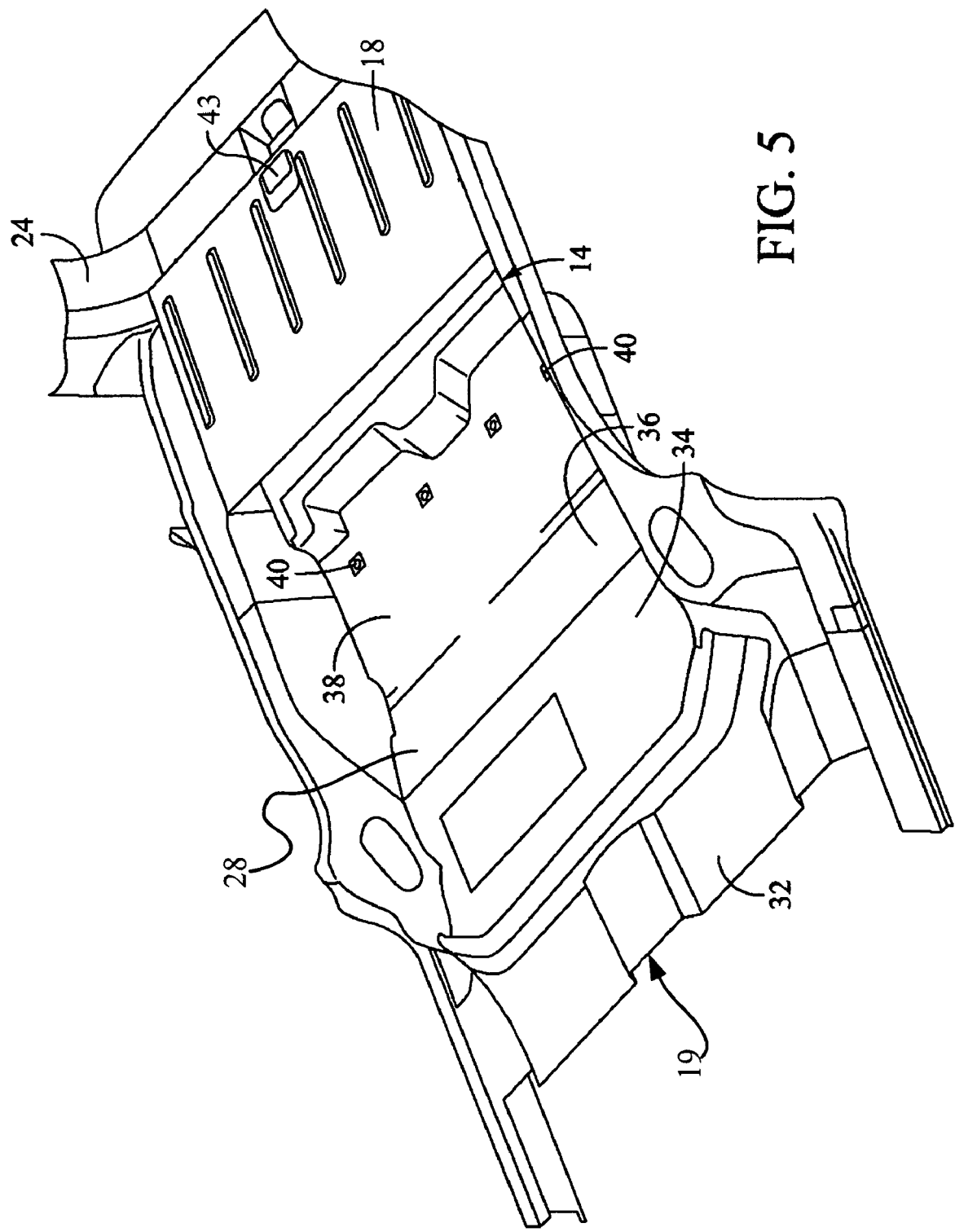
FIG. 5 is another perspective view, similar to FIG. 4, with the storage box cover and the storage box removed from the vehicle body structure to show details of a portion of the vehicle floor arranged and configured to receive a third row of seats, in accordance with the present invention.
Figure 6:
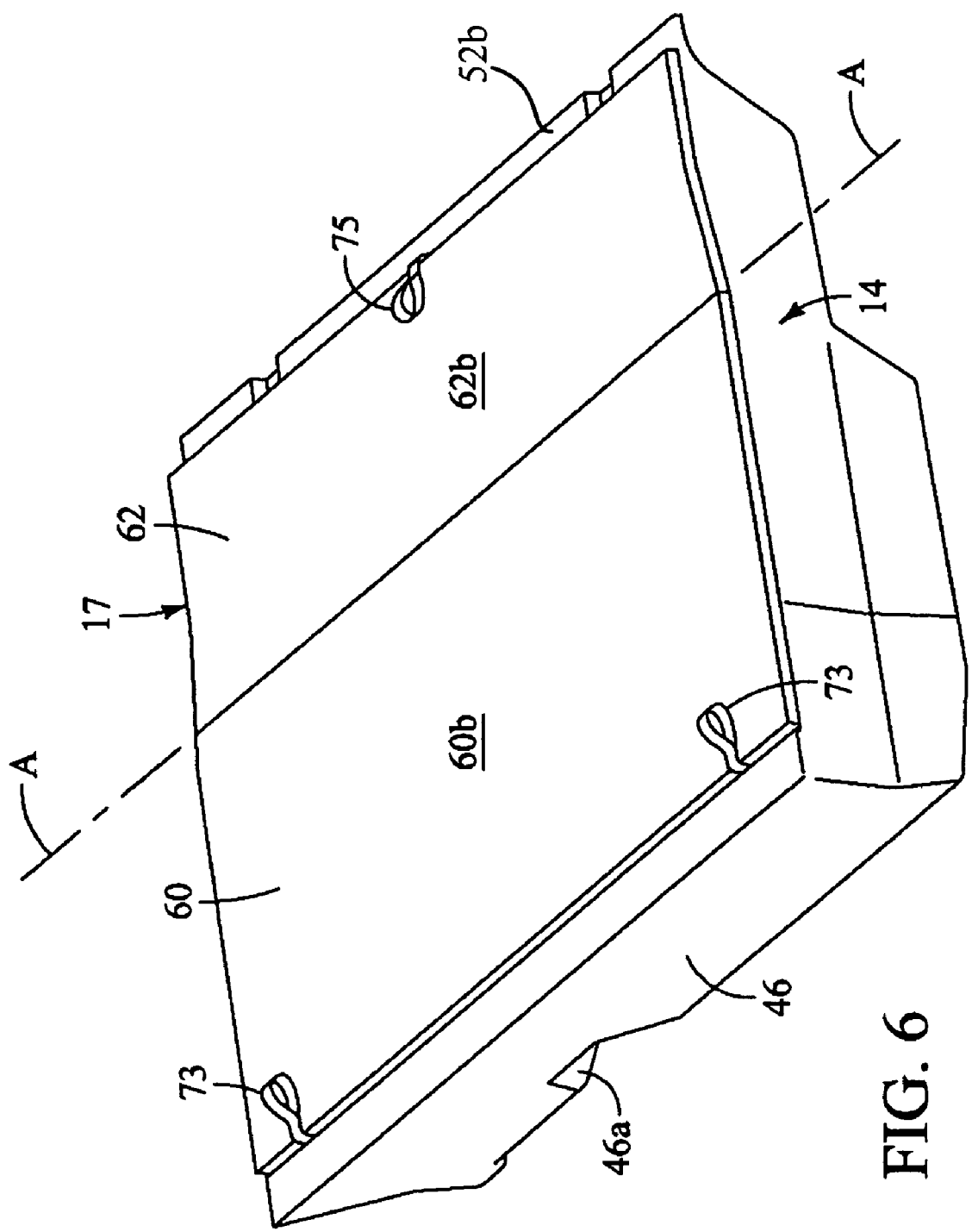
FIG. 6 is a perspective view of the storage box and storage box cover, shown removed from the vehicle, in accordance with the present invention.

As shown in FIG. 5, the second row of seats 12, the storage box 14 and the storage box cover 17 have removed to expose the vehicle floor 19. The vehicle floor 19 includes an upper surface 28 that is configured and arranged to support the first and second row of seats 11 and 12 as well as a third row of seats (not shown) when the storage box 14 is not installed. Basically, the upper surface 28 includes a first row seat area (not shown) with a first mounting portion (not shown), a second row seat area 32 with a second mounting portion 34, a third row seat area 36 with a third mounting portion 38 and the cargo surface 18. It should be noted that in FIGS. 2, 3 and 4, the third row seat area 36 and the third mounting portion 38 are not visible because the storage box 14 of the present invention is installed and is covered by the storage box cover 17.

The second row seat area 32 is a contoured surface as shown in FIGS. 3, 4 and 5 having both planar and curved sections thereof. The second row seat area 32 is dimensioned for providing leg room for passengers seated in the second row of seats 12. The second row seat area 32 can be completely planar or can have several planar sections and/or curved sections depending upon the design of the vehicle V. The second mounting portion 34 (see FIGS. 4 and 5) of the vehicle floor 19 is located behind and adjacent to the first row seat area (not shown). The second mounting portion 34 includes mounting hardware such as threaded bolt holes or locking pins (not shown) for supporting the second row of seats 12. Similarly, the second row of seats 12 includes corresponding hardware for connecting the second row of seats 12 to the second mounting portion 34 in a longitudinal orientation with respect to the vehicle V.

Figure 10:
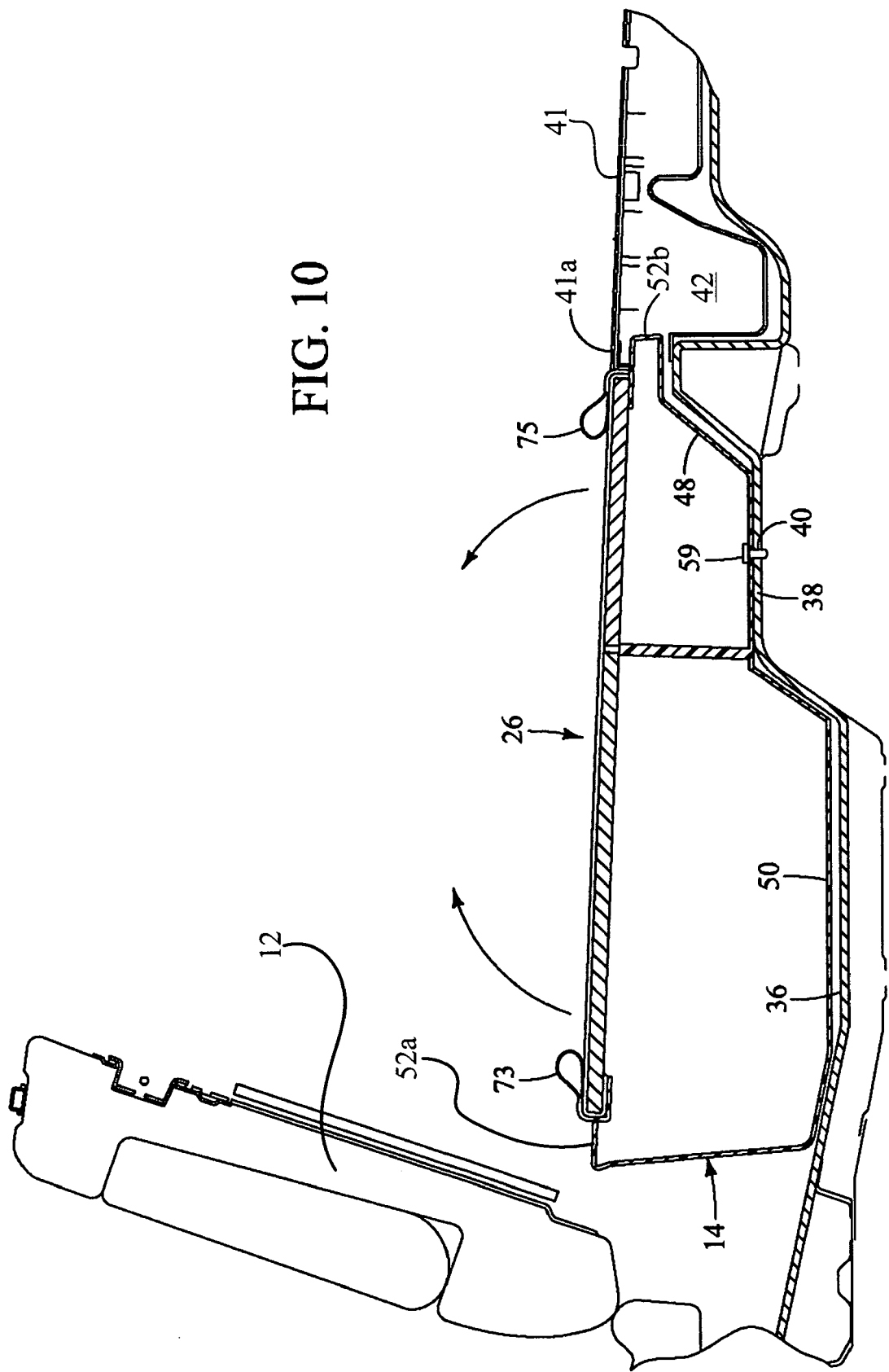
FIG. 10 is a partial longitudinal cross-section of a portion of the vehicle body structure showing selected details of the vehicle body structure, the storage box and the storage box cover, in accordance with the present invention.
Figure 11:
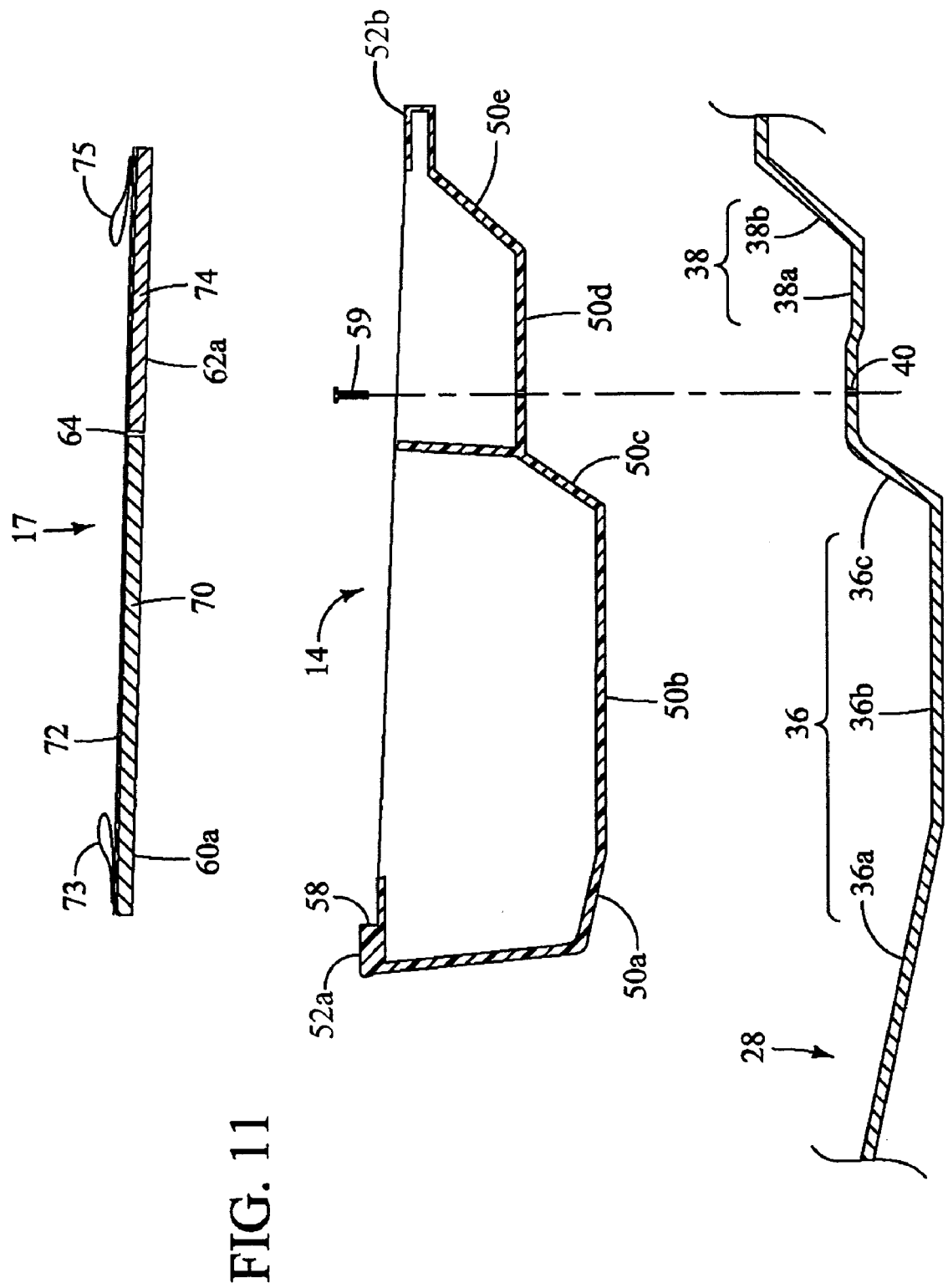
FIG. 11 is an exploded view of portions of FIG. 10, showing details of portions of the floor of the vehicle body structure, the storage box and storage cover, in accordance with the present invention.
Figure 12:
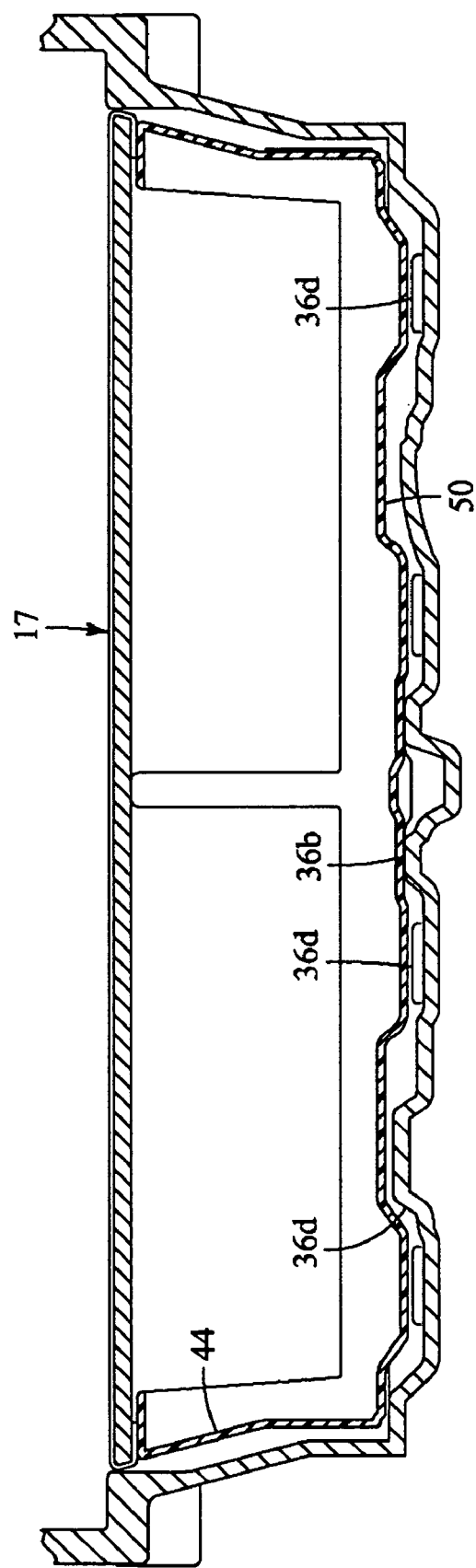
FIG. 12 is a partial transverse cross-section of a portion of the vehicle body structure showing selected details of the vehicle body structure, the storage box and the storage box cover, in accordance with the present invention.

The third row seat area 36 of the vehicle floor 19 includes multi-dimensional surfaces as shown in FIGS. 5, 10 and 11. The third row seat area 36 can be planar or can have several planar and curved sections depending upon the design of the vehicle V. The third row seat area 36 is dimensioned for legroom for passengers seated in a third row of seats (not shown). In the embodiment shown in FIG. 11, the third row seat area 36 includes a first section 36a, a second section 36b and a third section 36c. The first section 36a is generally planar in the area depicted in FIG. 11. The first section 36a is angled with respect to the second section 36b. The section 36c is also angled with respect to 36b. It should be noted from FIG. 11 that in the depicted portion of the third row seat area 36, the first, second and third sections 36a, 36b and 36c are each generally planar. However, as shown in FIG. 12, the second section 36b of the third row seat area 36 is shown with several recessed sections 36d.

The third mounting portion 38 of the vehicle floor 19 is located behind and adjacent to the third row seat area 36. In the embodiment shown in FIGS. 10 and 11, the third mounting portion 38 includes a first section 38a and a second section 38b. The first section 38a is generally planar in the area depicted in FIG. 10. The second section 38b is inclined with respect to the first section 38a. The first section 38a of the third mounting portion 38 includes mounting hardware such as threaded bolt holes 40 or alternatively, locking pins (not shown) for supporting the unshown third row of seats. With the third row of seats omitted, the third row seat area 36 provide space for installation of the storage box 14 and the storage box cover 17 of the present invention, as shown in FIGS. 2, 3 and 4 and 10. Moreover, the storage box 14 is mounted to the floor using the same mounting structure (first section 38a with the hole 40) that is used to mount the third row of seats.

The cargo surface 18 is located behind the third mounting portion 38. The cargo surface 18 defines a large cargo space, as is more clearly shown in FIGS. 2, 3, 4, 5 and 10. In the depicted embodiment, the cargo surface 18 is a removable cover 41 that provides access to a supplemental storage compartment 42, as indicated in FIG. 10. The removable cover 41 is opened by operating a latch handle 43 (see FIGS. 3, 4 and 5). The removable cover 41 includes a latch mechanism (not shown) connected to the latch handle 43 that allows the removable cover 41 to be opened revealing the supplemental storage compartment 42. The removable cover 41 is preferably pivotally coupled to the vehicle floor 19 in a conventional manner (not shown). The unshown pivoting coupling to the vehicle floor 19 is preferably provided proximate a forward edge 41a of the removable cover 41. Accordingly, the forward edge 41a is prevented from moving upwardly with the removable cover 41 in a closed position.

It should be understood from the drawings and description herein that the supplemental storage compartment 42 is an optional feature of the vehicle V. Further, in an alternate embodiment the cargo surface 18 can be a non-movably fixed portion of the vehicle floor 19. In the alternate embodiment there is no supplemental storage compartment 42 and no removable cover 41.

The cargo surface 18 is accessed through the rear hatch opening 24 when the rear hatch 23 is in an open position. The cargo surface 18 can also be accessed via the door openings 22.

A detailed description of the storage box 14 and storage box cover 17 is now provided, with reference to FIGS. 6 through 15. The storage box 14 and the storage box cover 17 are shown removed from the vehicle V in FIGS. 6, 8 and 9. Further, the storage box 14 is shown without the storage box cover 17 in FIG. 7.

The storage box 14 of the present invention is installed on top of the third row seat area 36 via the third mounting portion 38, as shown in FIGS. 2, 3, 4, 10, 11 and 12. The storage box 14 is designed to conform to the shape of the third row seat area 36 such that the storage box cover 17 is maintained level with the cargo surface 18, thereby extending the flat cargo space within the vehicle V. Specifically, the storage box cover 17 and the cargo surface 18 form a generally planar surface upon which to place cargo with the storage box cover 17 closed.

Referring specifically to FIGS. 6–10, the storage box 14 is preferably a one-piece, unitary member molded form a rigid plastic material. Alternatively, the storage box 14 is formed of any of a variety of materials, such as metal, molded plastic or composite materials. The storage box 14 basically includes two opposing side walls 44, a front wall 46, a back wall 48, a lower wall 50, a forward peripheral ridge 52a and a rearward peripheral ridge 52b. The two opposing side walls 44, the front wall 46 and the back wall 48 define a cargo cavity 53 having an upper opening 54 that can receive cargo placed therein. Two divider walls 55 and 56 are also formed in the storage box 14 to partition the cargo space within the storage box 14 into three smaller compartments. Specifically, the divider wall 55 divides the cargo space within the storage box 14 into a forward cargo section 53a and a rearward cargo section 53b (see FIGS. 7, 8 and 9). The divider wall 56 divides the forward cargo section 53a into two smaller areas. In the depicted embodiment, the divider walls 55 and 56 are fixed portions within the storage box 14. However in an alternative embodiment, the divider walls 55 and 56 can be removable. In any event, the storage box 14 is preferably divided into a plurality of discrete storage spaces.

Figure 7:
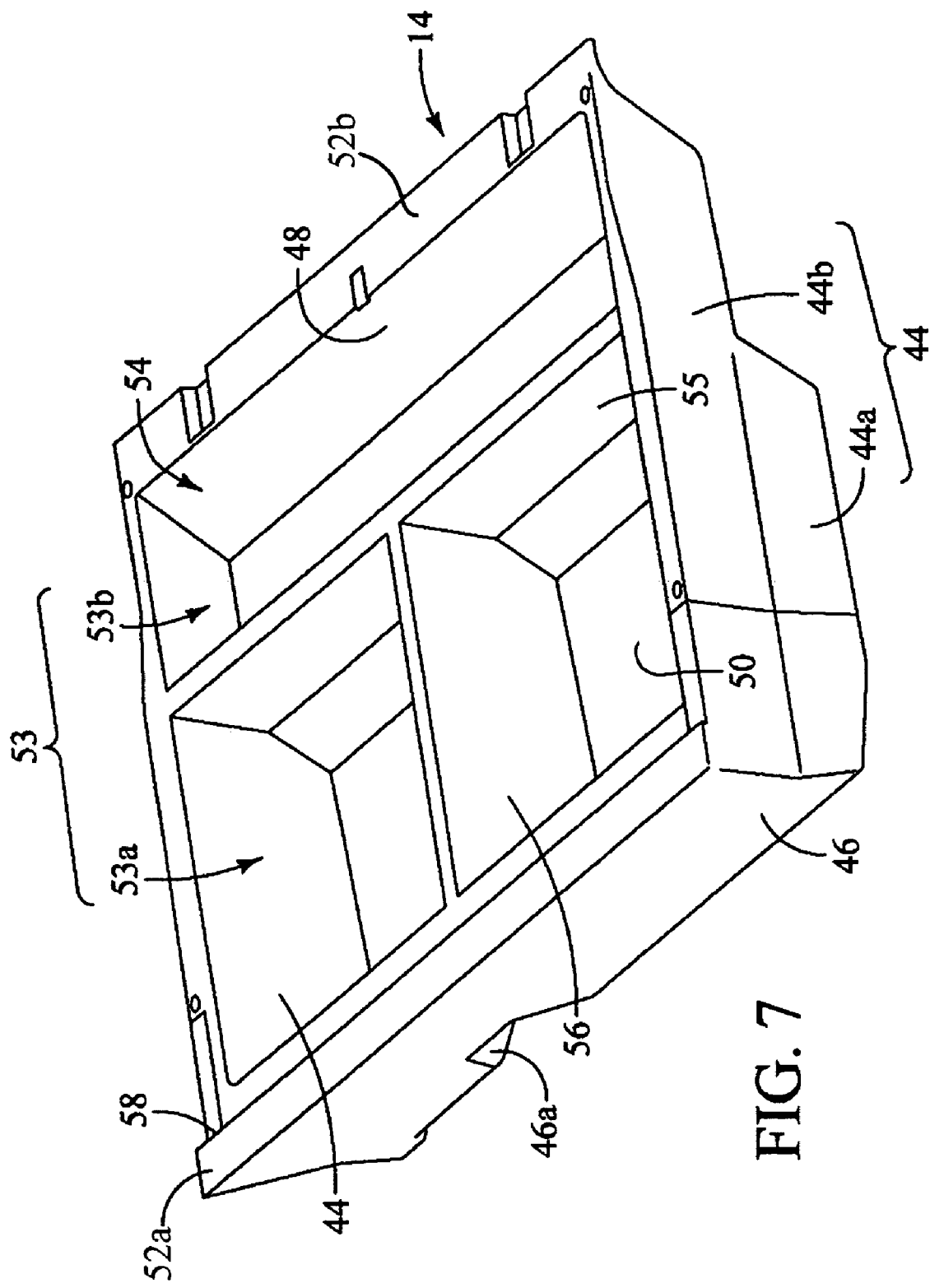
FIG. 7 is a perspective view of the storage box similar to FIG. 6, with the storage box cover removed, in accordance with the present invention.
Figure 8:
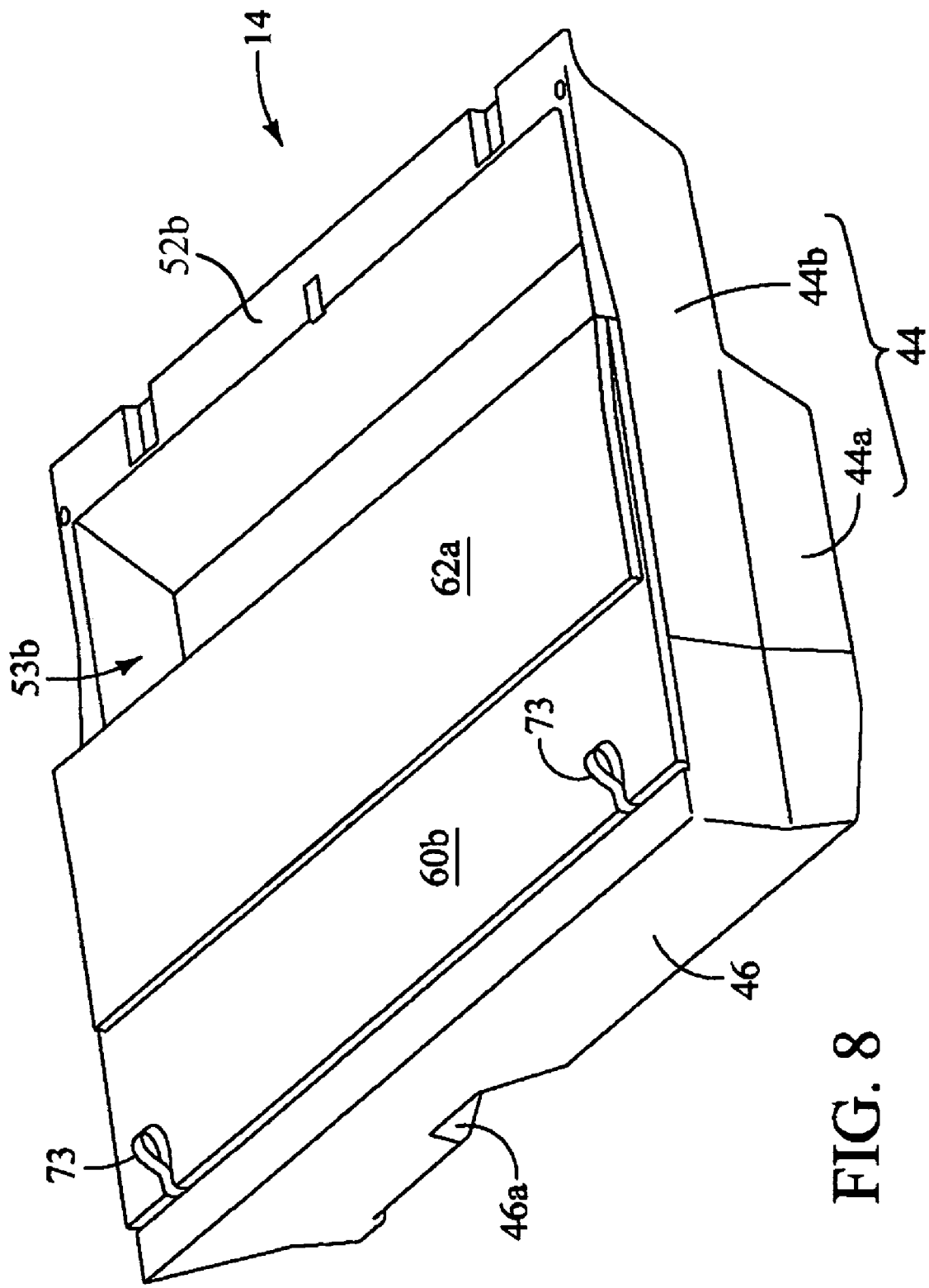
FIG. 8 perspective view of the storage box similar to FIG. 6 with a rearward lid of the storage box cover fully opened, in accordance with the present invention.
Figure 9:
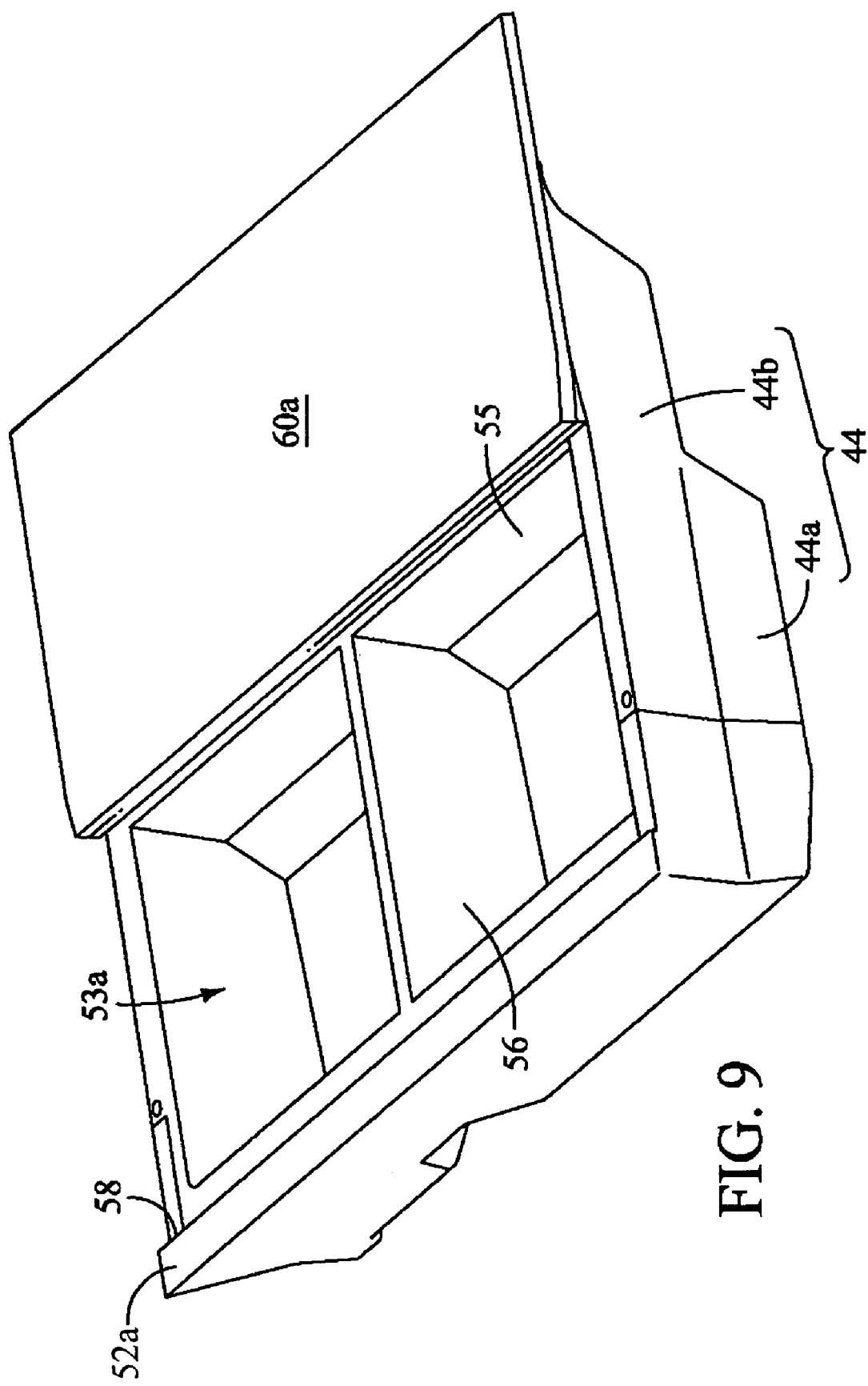
FIG. 9 perspective view of the storage box similar to FIG. 6 with a forward lid of the storage box cover fully opened, in accordance with the present invention.

The two opposing side walls 44 of the storage box 14 have generally the same shape. As indicated in FIGS. 7, 8 and 9, the two opposing side walls 44 have a deep portion 44a and a shallow portion 44b to conform to the differing depths of the third row seat area 36 and third mounting portion 38. The front wall 46 is generally planar but includes at least one recessed portion 46a to accommodate the irregular shape(s) of the third row seat area 36. Similarly, the back wall 48 is contoured to accommodate irregular shapes of the third mounting portion 38.

The lower wall 50 of the storage box 14 is also formed with contours in order to complement and generally conform to the shape of the first, second and third sections 36a, 36b and 36c and the first and second sections 38a and 38b that all define of the third row seat area 36. In other words, the lower wall 50 is formed with lower wall sections 50a, 50b, 50c, 50d and 50e that make it possible for the storage box 14 to rest evenly and securely on the third row seat area 36. Specifically, the lower wall section 50a is dimensioned to lie evenly over the first section 36a of the third row seat area 36. The lower wall section 50b is dimensioned to lie evenly over the second section 36b of the third row seat area 36. The lower wall section 50c is dimensioned to lie evenly over the third section 36c of the third row seat area 36. The lower wall section 50d is dimensioned to lie evenly over the first section 38a of the third mounting portion 38. And finally, the lower wall section 50e is dimensioned to lie evenly over the second section 38b of the third mounting portion 38.

The forward peripheral ridge 52a of the storage box 14 extends along the top of the front wall 46 between the two opposing side walls 44 of the storage box 14. The forward peripheral ridge 52a is formed with and fixedly attached to a forward portion of the two opposing side walls 44 and an upper edge of the front wall 46. As more clearly seen in FIG. 11, the forward peripheral ridge 52a is formed with a recess 58 that restricts movement of the storage box cover 17.

The rearward peripheral ridge 52b is integrally formed with the walls of the storage box 14 and extends rearward relative to the vehicle V. The rearward peripheral ridge 52b extends under the forward edge 41a of the removable cover 41.

The storage box 14 is separable from the vehicle floor 19 as a modular unit. The storage box 14 is releasably attached to the vehicle floor 19 by bolts 59 that extend through the bolt holes 40 (see FIGS. 10 and 11). By removing the bolts 59, the storage box 14 can be removed from the vehicle V.

The storage box cover 17 is installed atop the storage box 14 covering the upper opening 54 of the storage box 14 as shown in FIGS. 6, 8, 9, 10 and 11. In a closed position shown in FIG. 6, the storage box cover 17 contacts and rests on the two side walls 44, the recess 58 of the peripheral ridge 52 and the back wall 48. In an alternative embodiment, the storage box cover 17 can additionally contact and rest on the divider walls 54 and 55, depending on the height of the divider walls 54 and 55. Forward movement of the storage box cover 17 is restricted by the recess 58 formed on the peripheral ridge 52.

Figure 13:
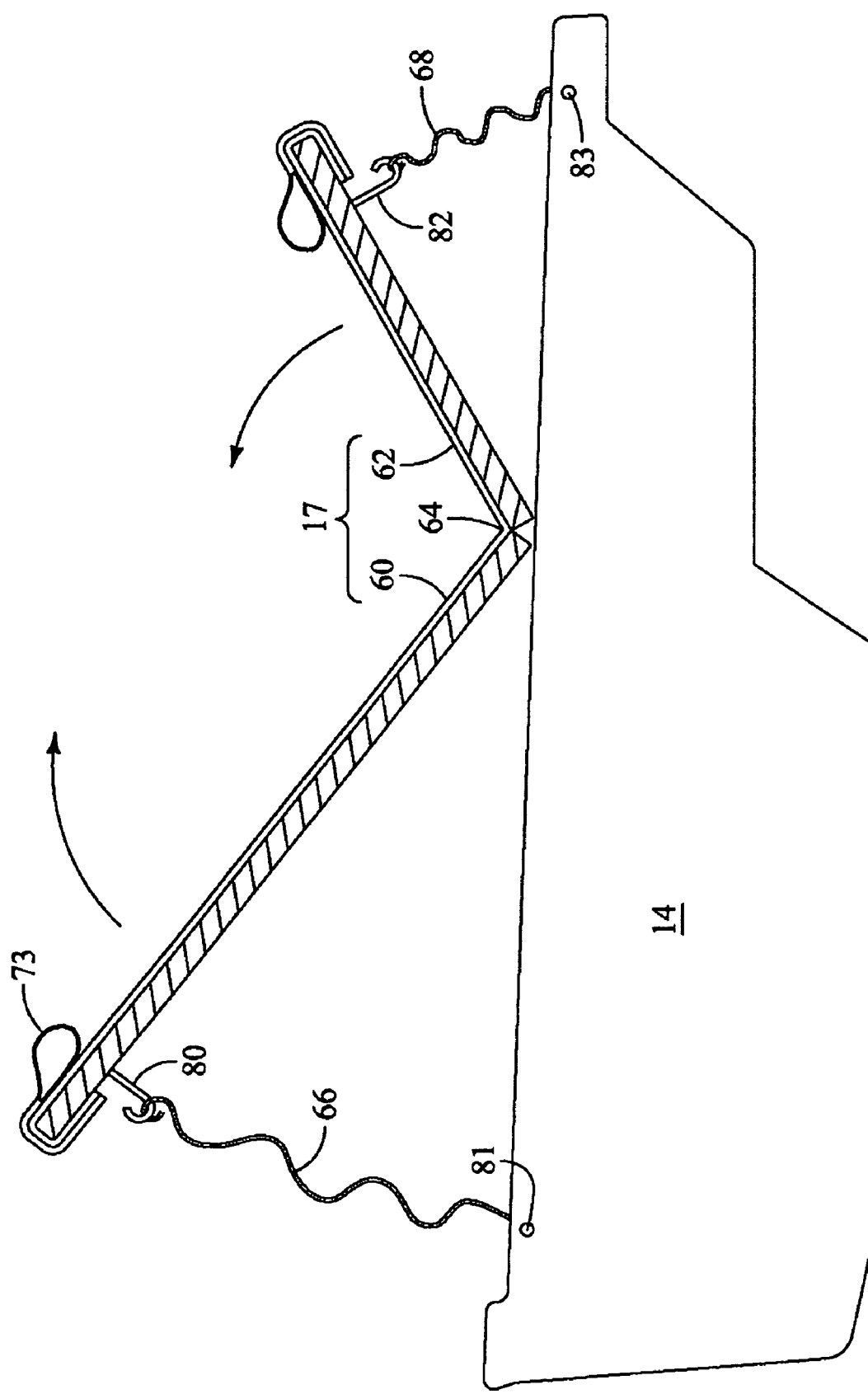
FIG. 13 is a side elevational view of the storage box and the storage box cover, showing the cover restriction members that restrict movement of the forward and rearward lids of the storage box cover, in accordance with the present invention.
Figure 14:
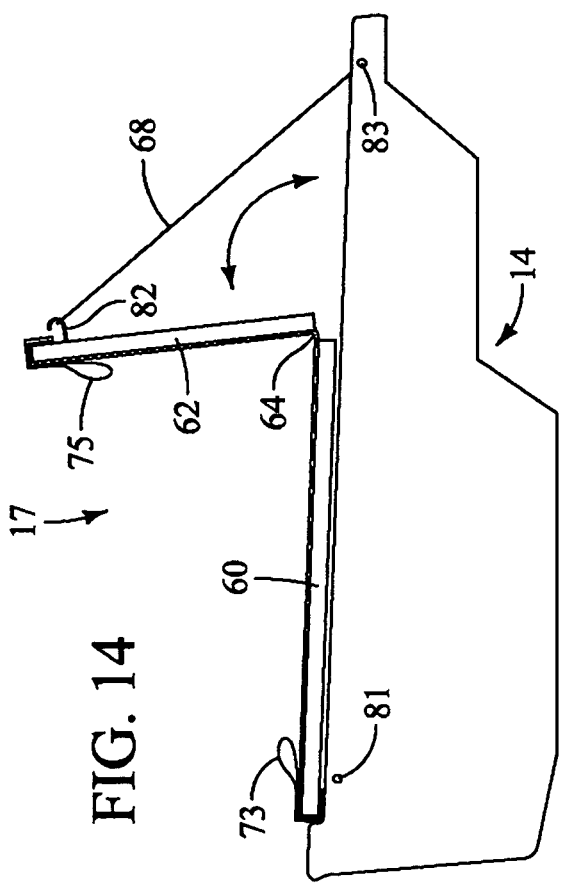
FIG. 14 is a side schematic view of the storage box and the storage box cover, showing the rearward lid of the storage box cover in a partially open position and restrained from opening any further by one of the restriction members.
Figure 15:
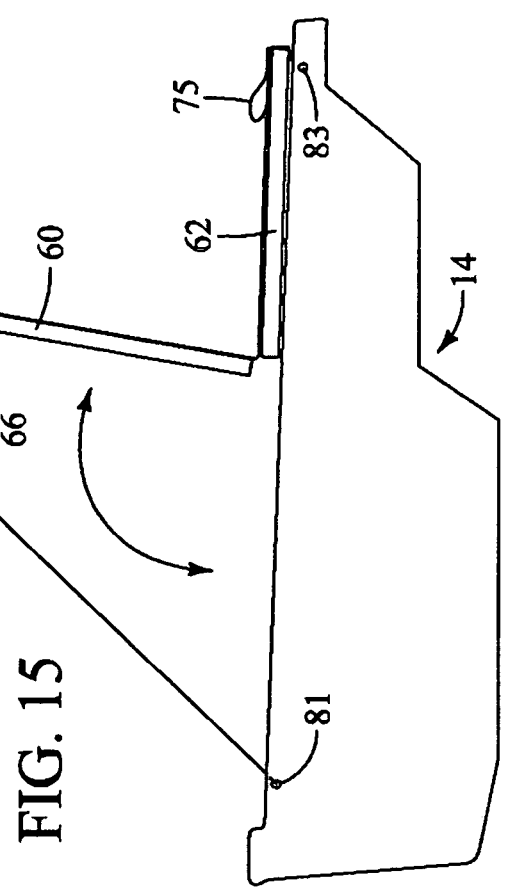
FIG. 15 is a side schematic view of the storage box and the storage box cover, showing the forward lid of the storage box cover in a partially open position and restrained from opening any further by another one of the restriction members.

As shown in FIGS. 6, 8, 9, 10, 11, 13, 14 and 15, the storage box cover 17 includes a forward opening first lid 60, a rearward opening second lid 62, and a living hinge 64. The storage box cover 17 also includes first and second restriction members 66 and 68, as shown in FIGS. 13, 14 and 15. The first and second lids 60 and 62 are separable from the vehicle floor 19 and the storage box 14 as a single unit.

With specific reference to FIGS. 11, 13, 14 and 15, the first lid 60 is made of rigid planar material or member 70 such as plywood, molded plastic or a composite material of sufficient strength to support heavy cargo placed thereon. The rigid planar member 70 is further covered with a carpeting material 72 that is glued or otherwise fixedly attached thereto. The carpeting material 72 is one of a variety of interior flooring materials that can be used to cover the rigid planar member 70.

The first lid 60 includes an inner surface 60a that covers the forward cargo section 53a and an outer surface 60b that is provided with a pair of strap handles 73. The first lid 60 opens to expose the forward cargo section 53a by pivoting about the living hinge 64. The first lid 60 can pivot about the living hinge 64 and pivot axis A (see FIG. 6) approximately 180 degrees from a closed position shown in FIG. 6 to an open position shown in FIG. 9. The first lid 60 can lie flat atop the second lid 62 when fully opened, as shown in FIG. 9. The first lid 60 is oriented such that the forward cargo section 53a is easily accessed from the second row of seats 12 and the side door openings 22, as indicated in FIGS. 3 and 4.

The second lid 62 is also made of a rigid planar material 74 such as plywood, molded plastic or a composite material of sufficient strength to support heavy cargo placed thereon. The rigid planar material 74 is further covered with the carpeting material 72 that is glued or otherwise fixedly attached thereto. The second lid 62 includes an inner surface 62a that covers the rearward cargo section 53b and an outer surface 62b that includes at least one strap handle 75. The second lid 62 opens to expose the rearward cargo section 53b by pivoting about the living hinge 64. The second lid 62 can pivot about the living hinge 64 and pivot axis A (FIG. 6) approximately 180 degrees from a closed position shown in FIG. 6 to an open position shown in FIG. 8. The second lid 62 can lie flat atop the first lid 60 when fully opened, as shown in FIG. 8. The second lid 62 is oriented such that the rearward cargo section 53b is easily accessed from the rear hatch opening 24, as indicated in FIGS. 3 and 4.

Side to side movement of the storage box cover 17 is restricted by the side body portions 20, as shown in FIG. 12. Rearward movement of the storage box cover 17 is restricted by the forward edge 41a of the removable cover 41, as shown in FIG. 10. As was mentioned above, forward movement of the storage box cover 17 is restricted by the peripheral ridge 52 on the recess 58.

It should be understood from the drawings and description herein that the carpeting material 72 forms the living hinge 64 that connects the first and second lids 60 and 62. However, it should also be understood from the drawings and description herein that the living hinge 64 can be formed by any of a variety of interior flooring materials that have flexibility and durability sufficient to support the first and second lids 60 and 62 and serve as a hinge therebetween.

With specific reference now to FIGS. 13, 14 and 15, the first restriction member 66 is an elongated flexible member that has first and second ends and is preferably made of rope or other flexible material with sufficient strength to restrict movement of the first lid 60. The first end of the first restriction member 66 is removably attached to a connector 80 fixed to the first lid 60 proximate a forward edge thereof, as shown in FIG. 13. The second end of the first restriction member 66 is removably attached to a fastener 81 fixed to the storage box 14 to restrict movement of the first lid 60. With the first restriction member 66 attached to both the storage box 14 and the first lid 60, the first lid 60 is restricted to movement of less than 180 degrees of the fully open position, and preferably to approximately 100 degrees about the living hinge 64 as shown in FIG. 15. The first lid 60 remains in a generally vertical orientation with the first restriction member 66 attached thereby making closing the first lid 60 easier. It should be understood from the drawings and description herein that the first restriction member 66 has been detached from the first lid 60 in FIG. 9.

The second restriction member 68 is an elongated flexible member that has first and second ends and is preferably made of rope or other flexible material with sufficient strength to restrict movement of the second lid 62. The first end of the first restriction member 68 is removably attached to a connector 82 that is fixed to the second lid 62 proximate a forward edge thereof, as shown in FIG. 13. The second end of the second restriction member 68 is removably attached to a fastener 83 fixed to the storage box 14 to restrict movement of the second lid 62. With the second restriction member 68 attached to both the storage box 14 and the second lid 62, the second lid 62 is restricted to movement of less than 180 degrees, and preferably to approximately 100 degrees about the living hinge 64 as shown in FIG. 14. The second lid 62 remains in a generally vertical orientation with the second restriction member 68 attached thereby making closing the second lid 62 easier. It should be understood from the drawings and description herein that the second restriction member 68 has been detached from the second lid 62 in FIG. 8.

The storage box cover 17 is removable as a unit from the storage box 14. The living hinge 64 connects the first and second lids 60 and 62, but is not connected to the storage box 14. Alternatively, the living hinge 64 can be attached to the storage box 14 by an adhesive, by mechanical fasteners or by VELCRO™. In another embodiment, the living hinge 64 can be replaced with a mechanical hinge device (not shown).

Further, the first and second restriction members 66 and 68 are removably attached to the storage box cover 17. Once the first and second restriction members 66 and 68 are detached from the storage box cover, the storage box cover 17 can be lifted from the storage box 14. With the storage box cover 17 removed, the storage box 14 is more easily removed As should be understood from the drawings and the above description of the present invention, the storage box 14 and storage box cover 17 provide two levels of storage for the vehicle V. First, the storage cavity within the storage box 14 provides a covered storage compartment suitable for small items that not accessed often or are to be concealed from view. Since the forward cargo section 53a and the rearward cargo section 53b of the cargo cavity 53 are positioned below the storage box cover 17, there is additional storage space below the surface of the vehicle floor 19. Items stored in the cargo cavity 53 of the storage box 14 are hidden from view due to the presence of the storage box cover 17.

Second, the storage box cover 17 is level with the lid 42 of the cargo surface 18 thereby extending the level of the vehicle floor 19 and increasing overall usable cargo space of the vehicle V. Since multi-dimensional or uneven surfaces the third row seat area 36 and the third mounting portion 38 of the vehicle floor 19 are covered by the storage box 14 and the storage box cover 17, it is possible to place larger object in the extended storage space atop the lid 42 and the storage box cover 17 without the problems associated with loading items on uneven surfaces.

While the embodiment described above and shown in the drawings is directed to a storage box installed over an area designed to fit a third row of seats within a vehicle, it should be understood from the drawings and description herein that the storage box 14 of the present invention can be installed to fit in any area of a vehicle having uneven surfaces. For instance, the storage box 14 can alternatively be installed in over the second row seat area 32 and the second mounting portion 34 of the vehicle floor 19. Further, the storage box 14 can be installed over any area of a vehicle floor having uneven or multi-dimensional surfaces. For example, the lower wall 50 of the storage box 14 can be modified to include contours and surface features to compliment any multi-dimensional surface within a vehicle.

Further, the storage box 14 and the storage box cover 17 are not limited to use in SUV, such as that depicted in the drawings. The present invention is installable in vans or passenger vehicles that have uneven surfaces that can serve as extended cargo space. The storage box 14 can be formed with any of a variety of contours such that the side walls and bottom wall conform to uneven surface(s) on a vehicle floor. With the storage box cover 17 installed on such a storage box, amount the cargo storage area is increased as well as the cargo deck is increased.

As used herein, the following directional terms "forward, rearward, fore, aft, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle body structure comprising:
    a vehicle side body including a side access opening and a rear access opening;
    a vehicle floor fixedly coupled to the vehicle side body with the vehicle floor including an cargo surface;
    a row of first seats fixedly coupled to the vehicle floor at a first longitudinal location within the vehicle side body;
    a row of second seats fixedly coupled to the vehicle floor at a second longitudinal location within the vehicle side body;
    a third seat receiving recess formed in the vehicle floor that is configured to receive a row of third seats;
    a cargo space between the third seat receiving recess and the rear access opening;

a storage box installed in the third seat receiving recess, the storage box including a plurality of walls defining an upper opening and a cargo cavity extending downwardly from the upper opening below the cargo surface of the vehicle floor, the storage box being configured to encompass substantially an entire area of the vehicle floor from the second seats to the cargo space and laterally between the vehicle side body; and a storage cover overlying the upper opening of the storage box.

2. The vehicle body structure as set forth in claim 1, wherein the storage cover includes first and second lids with the first lid being arranged to move between a closed position covering a forward area of the cargo cavity and an open position exposing the forward area of the cargo cavity to the side access opening, and the second lid being arranged to move between a closed position covering a rearward area of the cargo cavity and an open position exposing the rearward area of the cargo cavity to the rear access opening.

3. The vehicle body structure as set forth in claim 2, wherein the first and second lids are covered with an interior flooring material forming a living hinge coupling the first and second lids together.

4. The vehicle body structure as set forth in claim 3, wherein the living hinge has a pivot axis extending from side to side between side walls of the vehicle side body.

5. The vehicle body structure as set forth in claim 4, wherein the interior flooring material includes a carpeting material.

6. The vehicle body structure as set forth in claim 4, further comprising:

a first restriction member attached to the first lid and configured to hold the first lid in the open position of the first lid; and a second restriction member attached to the second lid and configured to hold the first lid in the open position of the second lid about the living hinge.

7. The vehicle body structure as set forth in claim 6, wherein the first and second restriction members are each made from an elongated flexible material.

8. The vehicle body structure as set forth in claim 4, wherein the living hinge is configured such that the first and second lids pivot 180 degrees between the closed and open positions of the first and second lids.

9. The vehicle body structure as set forth in claim 4, wherein the first and second lids are separable from the vehicle floor as a single unit.

10. The vehicle body structure as set forth in claim 1, wherein the storage box is divided into a plurality of discrete storage spaces.

* * * * *